United States Patent [19]
Watanabe et al.

[11] Patent Number: 4,998,125
[45] Date of Patent: Mar. 5, 1991

[54] REMOTE-CONTROLLED CAMERA

[75] Inventors: Koji Watanabe; Kenji Miyama; Takayuki Oohisa, all of Hachioji; Koyoshige Okagakiuchi, Ome; Zenichi Sakai, Urawa, all of Japan

[73] Assignee: Konica Corporation, Tokyo, Japan

[21] Appl. No.: 496,021

[22] Filed: Mar. 20, 1990

[30] Foreign Application Priority Data

Mar. 22, 1989 [JP] Japan .................................. 1-67416
Mar. 31, 1989 [JP] Japan .................................. 1-78106

[51] Int. Cl.⁵ ............................................. G03B 13/36
[52] U.S. Cl. .................................... 354/403; 354/266
[58] Field of Search .................... 354/403, 266, 412

[56] References Cited

U.S. PATENT DOCUMENTS

| | | | |
|---|---|---|---|
| 4,816,855 | 3/1989 | Kitaura et al. | 354/266 |
| 4,864,340 | 9/1989 | Kaneko | 354/266 |
| 4,884,094 | 11/1989 | Kitaura et al. | 354/412 |
| 4,937,604 | 6/1990 | Yoshida et al. | 354/266 |

*Primary Examiner*—Russell E. Adams
*Attorney, Agent, or Firm*—Finnegan, Henderson, Farabow, Garrett and Dunner

[57] ABSTRACT

A camera for taking a photograph, comprising; a distance measure for measuring a distance between the camera and an object to be taken the photograph, wherein the distance measure irradiate a first infrared light beam onto the object for obtaining the distance; a remote controller for controlling a photo-taking operation of the camera, in which the remote controller transmits plural second infrared light beams to the camera; in which the first infrared light beam is irradiated in-between the plural second infrared light beams transmitted to the camera.

2 Claims, 5 Drawing Sheets

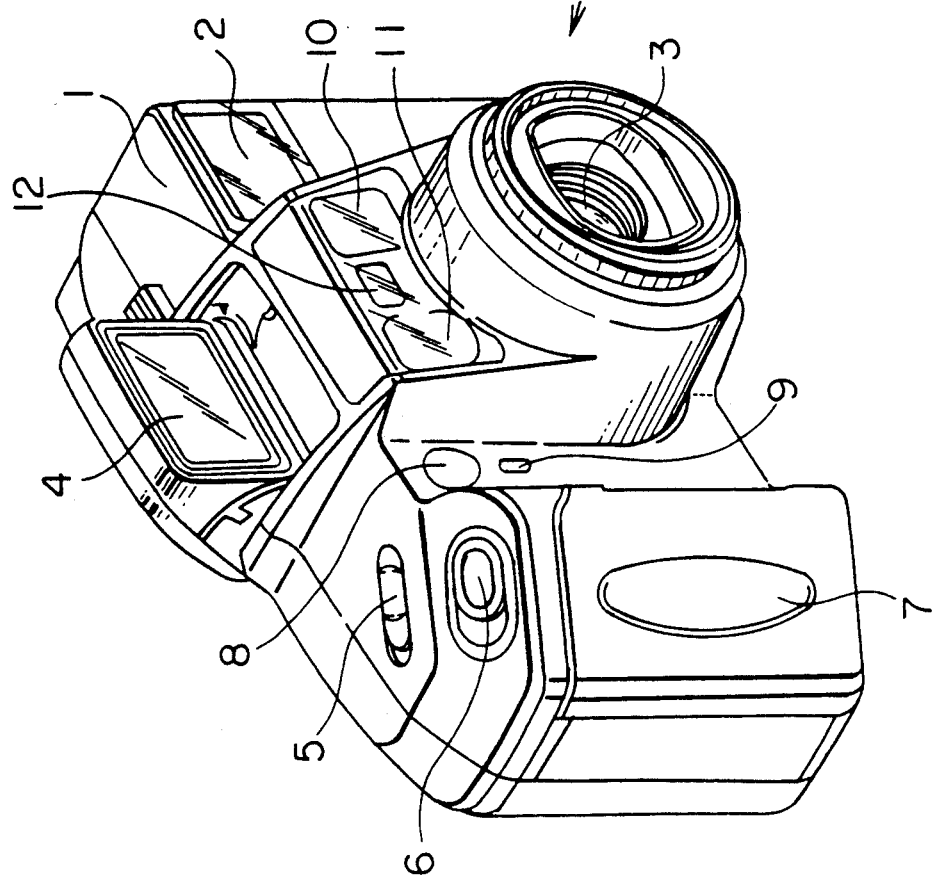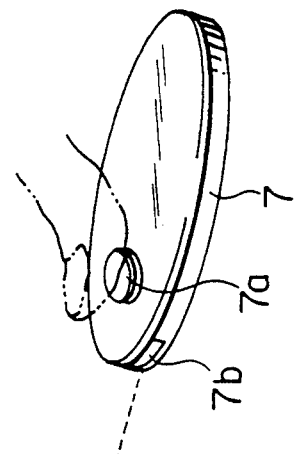

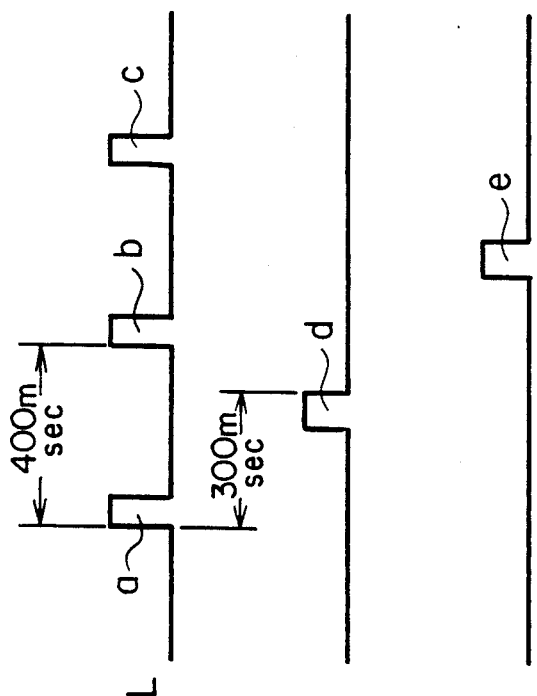

REMOTE-CONTROLLED CAMERA

BACKGROUND OF THE INVENTION

The present invention relates to a remote-controlled camera capable of being operated from a distance by the use of infrared light.

There have been widely used remote-controlled methods with which TV sets, audio sets and air conditioning systems can be operated from a distance by the use of infrared light or supersonic waves, and a remote-controlled camera is also available on the market.

In the conventional remote-controlled camera, remote-control signals are transmitted from a remote-control signal transmitter capable of being attached to or detached from a camera body, and when the remote-control signals are received on the camera, a shutter of the camera is released. In order for the remote-control signals to be received surely on the camera, pulse signals are generated repeatedly, thereby, even when the first pulse signal fails to be received, the following or other pulse signal can be received so that an remote-controlled operation may be made surely. (Refer to Japanese Patent Publication Open to Public Inspection No. 28987/1979 and Japanese Patent (Utility model) Publication Open to Public Inspection No. 96439/1982.)

On the other hand, some of the recent AF (automatic focusing) cameras employ an active method wherein a camera irradiates infrared light to a subject and then receives the reflected light from the subject, thereby obtaining the distance to the object (subject distance) through the principle of triangulation. When a camera of this kind is equipped with above-mentioned remote-control system, a remote-control signal transmitter continues transmitting pulses of infrared light even after the camera actions are started by the first pulse of infrared light in the remote-control signals, which may cause fear that such pulses of infrared light may be received by the AF reception unit in a camera. When it happens, the measured value of the subject distance may suffer a distortion, resulting in an inaccurate value.

The first object of the invention devised from the aforesaid viewpoint is to prevent that remote-control signals interfere with an AF reception unit in a remote-controlled camera wherein an active method with infrared light is employed as an AF system.

On the other hand, many of recent cameras are equipped with an AF (automatic focusing) mechanism, and it is possible to focus automatically on the subject which is framed in a frame called an AF frame. However, the AF frame is generally provided in a small space at the center of a viewfinder, and when a subject is out of the AF frame, the camera is focused not on the subject but on the background. Recently, therefore, a camera is equipped with a two-step shutter release button wherein a subject to be focused is first framed in an AF frame and then the subject distance is measured while the shutter release button continues being pressed by one step with the measured results being stored in a camera electrically or mechanically (this is called AF lock), and then the shutter release button is pressed to the full after changing the framing to the one desired by a user, thus aforesaid problems are solved.

The AF lock system is employed even in a remote-controlled camera, but on a conventional remote-controlled camera, the AF lock is canceled after completion of remote-controlled photographing for one frame. However, remote-controlled several shots under one framing are required in many cases, and in such a case in a conventional remote-controlled camera, a user has been compelled to go to the camera to repeat AF lock operations for each shot. This is very troublesome and it decreases the advantages of the remote-controlled operation that a camera can be operated from a distance.

The second object of the invention devised from aforesaid viewpoint is to provide a camera with which a subject staying at the same position can be photographed easily any number of times on a remote-controlled manner.

SUMMARY OF THE INVENTION

In order to achieve the aforesaid first and second objects of the invention, irradiation of infrared light for distance measurement actuated based on remote-control signals is made between transmission of remote-control signals, so that AF lock condition may be kept as long as a remote-control mode is set.

BRIEF DESCRIPTION OF THE DRAWINGS

FIG. 1 is a perspective view of an example of a remote-controlled camera according to the invention, FIG. 2 is a sketch drawing of a remote-control signal transmitter, FIG. 3(a), 3(b) and 3(c) is a timing chart showing an irradiation timing for infrared light used for distance measurement and a transmission timing for infrared light used for remote-controlled operation.

DETAILED DESCRIPTION OF THE INVENTION

Figure 4:
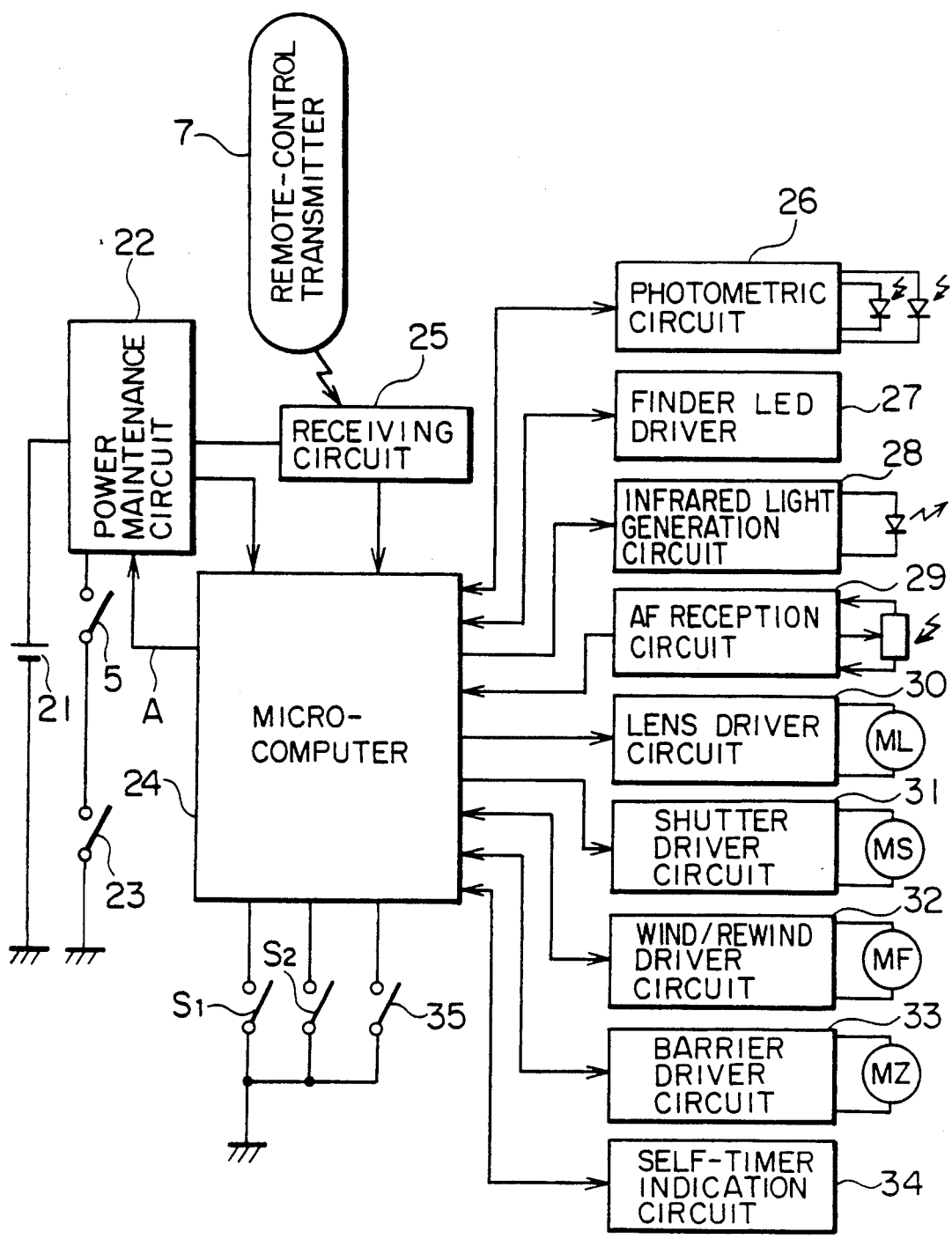
FIG. 4 is a block diagram showing a circuit composition and FIG. 5(a) and 5(b) is a flow chart showing actions in the example.

The invention will be explained as follows referring to the drawings.

FIG. 1 is a perspective view of an example of a remote-controlled camera according to the invention, and 1 in the figure is a main unit, 2 is a viewfinder, 3 is a photographing lens, 4 is a strobo flash, 5 is a main switch and 6 is a shutter release button. The numeral 7 is a remote-control signal transmitter which can be either mounted on or dismounted from the camera main unit and 8 is a remote-control signal receiving unit on the camera side. Push button 7a is provided as shown in FIG. 2 on the reverse side of the remote-control signal receiving unit which is observed when it is dismounted from camera main unit 1, and when the button 7a is actuated, light-transmitting unit 7b transmits infrared light for remote-control signals. When this light is received by remote-control signal receiving unit 8, the camera starts its photographing actions.

As shown in FIG. 3 (a), a remote-control signal is composed of a plurality of infrared light pulses a, b, c . . . and an emission interval for each pulse is, for example, 400 m sec.

The numeral 9 in FIG. 1 represents a display LED which is to be lit while the self-timer is in operation, and in the present example, it is used also as a means which tells that the remote-control mode is immediately before its end in a remote-control mode.

Further, 10 is an AF irradiating unit that irradiates infrared light for an active distance measurement, 11 is an AF receiving unit that receives the reflected light from a subject and 12 is a photometry unit that measures the brightness of a subject. When main switch 5 is turned OFF, photographing lens 3 is covered with a barrier (a lens cover), which is not shown in FIG. 1. After main switch is turned ON, the barrier is opened, causing a camera to be ready for photographing.

FIG. 4 is a block diagram showing the circuit composition of the remote-controlled camera in FIG. 1 and 21 in the figure is a power supply battery for a camera, 22 is a power maintenance circuit that supplies various prescribed power voltage to the necessary portions in a camera, 23 is a starting switch which is connected to main switch 5 in series and is linked to main switch 5, shutter release button 6 and mounting/dismounting of the remote-control signal transmitter and 24 is a control microcomputer. When main switch 5 is turned ON, starting switch 13 is also caused to be ON, causing power maintenance circuit 22 to supply the prescribed power voltage to microcomputer 24. Microcomputer 24 generates self-retaining signals onto power-supply-retaining circuit 22 through signal line A to control thereafter the supply of power by itself, thus the microcomputer 24 keeps its operation state even after main switch 5 is turned OFF.

The numeral 25 is a remote-control signal receiving circuit that receives remote-control signals transmitted from remote-control signal transmitter 7, 26 is a photometry circuit that measures subject brightness, 27 is an LED indicator in a viewfinder that indicates the results of photometry and distance measurement in viewfinder 2, 28 is an infrared rays radiating circuit that radiates infrared light for photometry, 29 is an AF receptor circuit that receives infrared light radiated from infrared light radiating circuit 28 and reflected on a subject and then generates distance measurement data corresponding to the subject distance, 30 is a lens-driving circuit that moves photographing lens 3 based on the measurement results, and brings it back to its home position, 31 is a shutter-driving circuit for opening or closing a shutter, 32 is a driving circuit for film-winding for film advancement and for film-rewinding, 33 is a barrier-driving circuit for opening or closing a barrier, and 34 is a self-timer-indicating circuit that lights display LED 9 when a self-timer mode is set.

Switches will be explained next. $S_1$ is a switch that is turned ON when shutter-release button 6 is pressed lightly, and $S_2$ is a switch that is turned ON when the shutter-release button 6 is further pressed. When $S_1$ is ON, photometry and distance measurement are performed, and based on the results thereof, a photographing lens is moved and is AF-locked. Under an ordinary photographing mode, when shutter-release button 6 is released thereafter to cause $S_1$ to be OFF, an AF-lock is released. Under the remote-control mode, however, the condition of AF-lock is kept even if the shutter-release button 6 is released. The numeral 35 is a remote-control switch that is provided on a camera and is turned ON when remote-control signal transmitter 7 is dismounted from the camera. The remote-control switch 35, when it is turned ON, causes the camera to be in a remote-control mode.

Actions in the example will be explained next, referring to the flow chart in FIG. 5.

Actions in an ordinary photographing mode which is not a remote-control mode will first be explained. A main switch, after being operated, causes the state of POWER ON (F-1) to appear. After the shutter-release button is pressed and $S_1$ is turned ON (F-2), photometry (F-3) and distance measurement (F-4) are performed. Then, ON/OFF of remote-control switch 35 is checked (F-5) and when it is OFF (not in a remote-control mode) as in this example, the flow skips to the step (F-9) where the results of photometry and distance measurement are indicated in the viewfinder. Then, $S_1$ is checked again (F-10) to confirm whether the shutter-releasing action is being made by user's intention or not, and then $S_2$ is checked whether it is ON or not (F-11), and when it is ON, judgment (F-12) whether a lens was once protruded or not is made. If a lens has not been protruded, the lens is protruded (F-13) based on the result of distance measurement, and a shutter is released so that a film may be exposed to light (F-14). After that, the protruded lens is brought back to its home-position (F-15) and a film motor is driven for film-winding (F-16). Next, remote-control switch 35 is checked if it is ON or not (F-17) and when it is not ON as in this example, the sequence is ended.

Actions in a remote-control mode will be explained next.

In the case of a remote-control mode, the remote-control switch 35 is ON in step (F-17). Therefore, the sequence advances to the step (F-18) and sets 5-minute timer. During this period of 5 minutes, the sequence waits, by means of a loop formed through (F-19), (F-20) and (F-21), whether remote-control signal receiving (F-20) comes or cancel (F-21) comes. During that period, if remote-control signal receiving comes in step (F-20), the sequence goes back to step (F-3) for photometry and distance measurement (F-4) is further made.

As shown in FIG. 3 (b), radiation by means of infrared light pulse d for distance measurement is made within a period of 300 m sec after remote-control signal receiving, which means that the radiation does not interfere with next infrared light pulse b for remote-control signals. In the present example, photometry is performed before distance measurement. Strictly speaking, therefore, radiation timing for infrared light pulse d for distance measurement may sometimes be delayed slightly depending upon the fluctuation of photometry time period. Anyway, however, a hardware as well as a software are designed so that infrared light pulse d for distance measurement may be radiated before the next infrared light signal pulse b of remote-control signals is radiated.

Figure 5A:
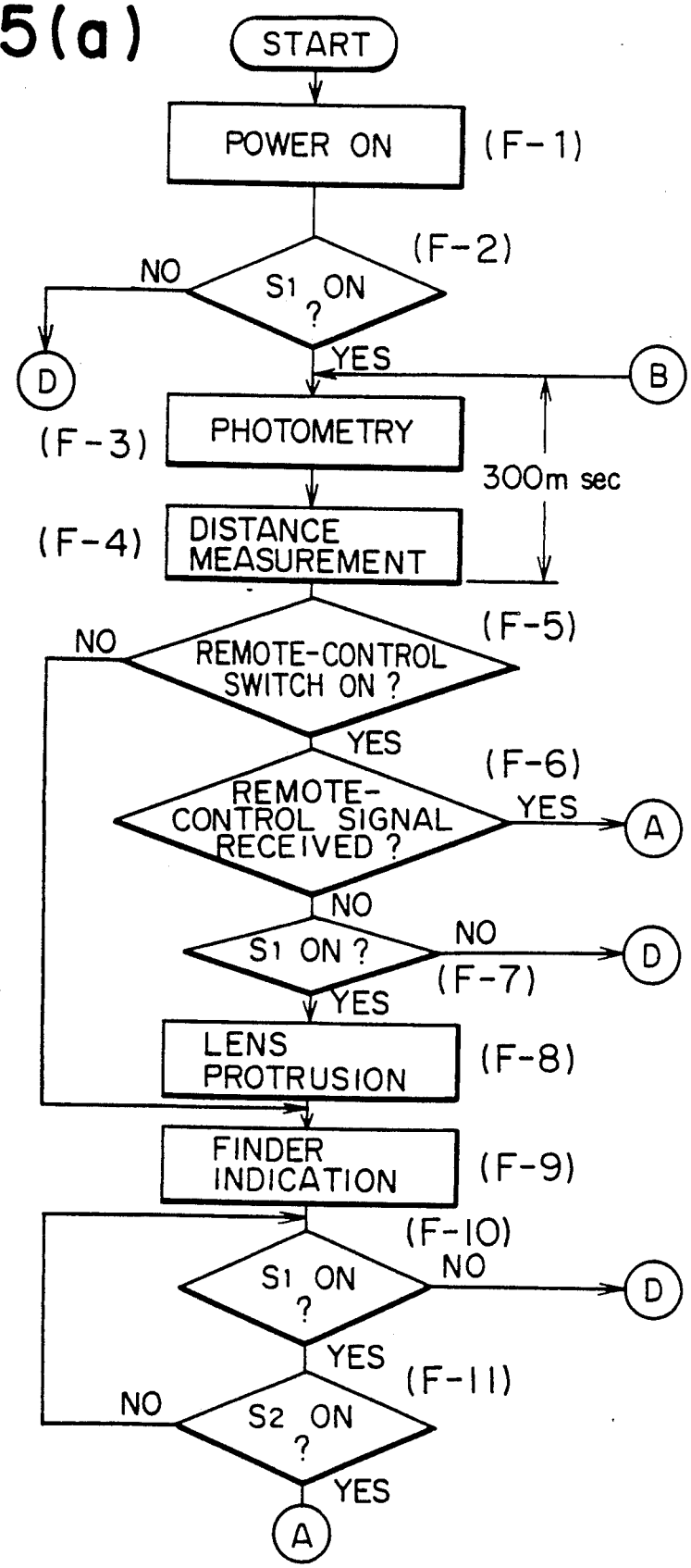
Figure 5B:
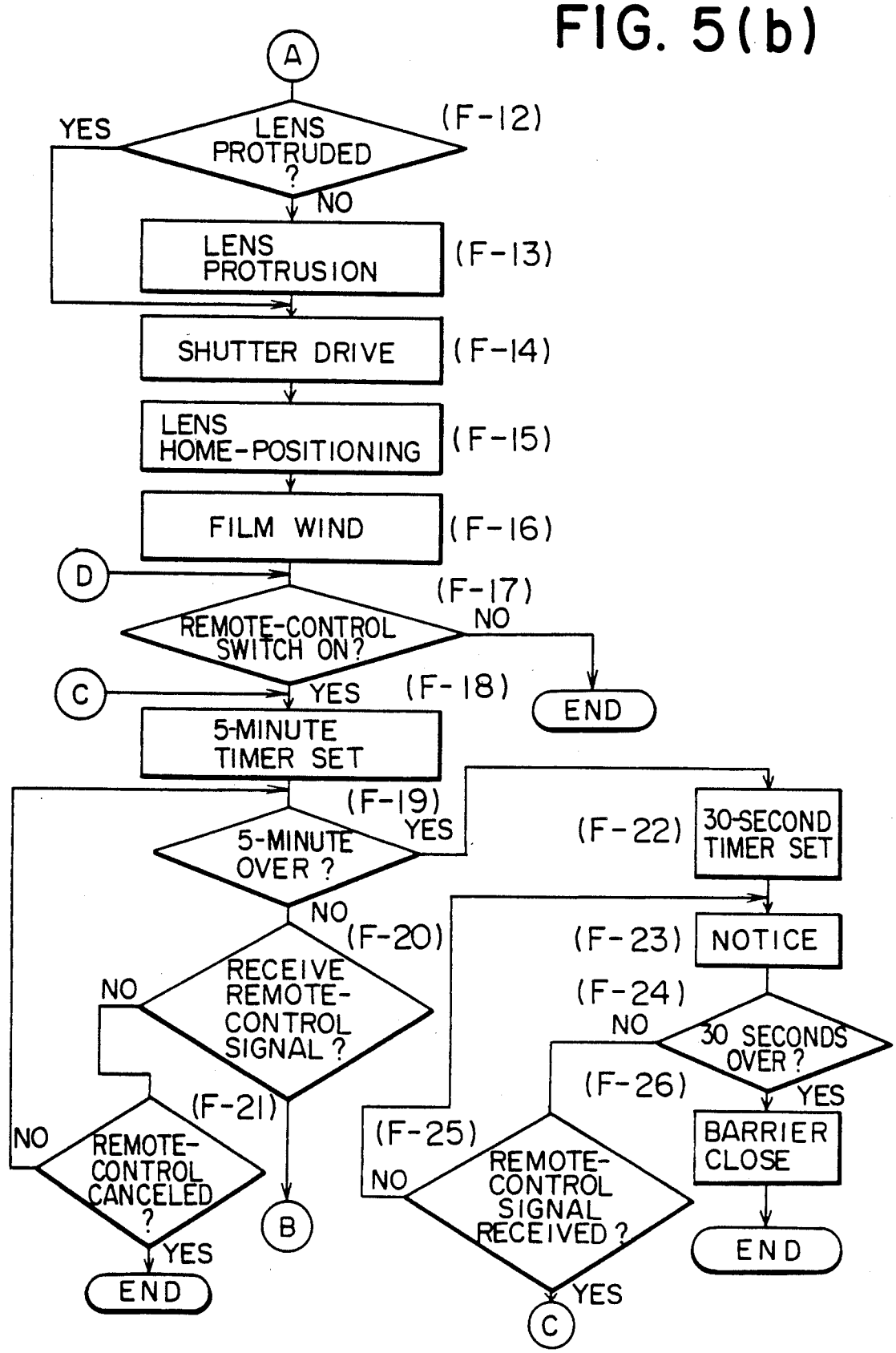

Going back to FIG. 5 (a), the sequence advances to steps (F-12) through (F-16) via steps (F-5) and (F-6) after distance measurement of (F-4), thereby performing a series of photographing actions. If these are performed under a remote-control mode in this case, a 5-minute timer is again set (F-18).

If a remote-control mode is canceled in step (F-21), the sequence is terminated. A remote-control mode is canceled when main switch 5 is turned OFF or when remote-control signal transmitter 7 is mounted (i.e. when remote-control switch 35 is turned OFF), and AF-lock is released.

After a timer period of 5 minutes has passed, a 30-second timer is set (F-22) and 'notice' which is shown by flashing LED 9 (F-23) is performed in order to let a user supposed to be operating from a distance know that the remote-control mode is approaching its end. A loop formed with steps (F-24) and (F-25) checks whether remote-control signal receiving comes in the period of 30 seconds or not. When remote-control signals are received (F-25), the sequence goes to step (F-18) and a 5-minute timer is set again, and when remote-control signals are not received, a barrier is closed (F-26) and the sequence is terminated.

When remote-control signals are not received (F-6) after the remote-control mode is set (F-5), S₁ is checked in terms of ON/OFF thereof (F-7) and when S₁ is ON, it is possible to protrude a photographing lens 3 according to the result of distance measurement (F-8) and to AF-lock. One way for AF-locking is to store only the results of distance measurement without protruding a photographing lens. In this example, however, the photographing lens is protruded after S₁ is turned ON so that a user may photograph as quickly as possible in the case of shutter-releasing in remote-control operation, and may perceive the sound and movement of lens protruding. Then, the results of photometry and distance measurement are displayed in the viewfinder (F-9), and S₁ is checked again in terms of ON/OFF thereof (F-10). When S₁ is OFF, the sequence advances to step (F-17) and above explained steps (to be on standby for remote-control signal receiving), started from (F-18), are executed.

In the example mentioned above, an infrared light pulse d for distance measurement is generated before the second infrared light pulse b of remote-control signals is generated as shown in FIG. 3 (a). As shown in FIG. 3 (c), however, an infrared light pulse e for distance measurement may be generated after the second infrared light pulse b of remote-control signals is generated. What is essential is that the radiation timing of infrared light for distance measurement does not coincide with that of infrared light for remote-control operation. It is a matter of course that all the timing of processing performed by the use of photoreceptor elements which respond to the wavelength in the infrared zone.

In the arrangement of the invention, it is possible to keep the state of AF-locking even between remote-control modes. As a modification thereof, it is possible to arrange so that the state of AE-locking (an exposure value obtained from the photometry is stored in a camera) can be kept even between remote-control modes.

In the invention, as stated above, it is possible to prevent that the remote-control signals interfere with an AF reception unit in a remote-controlled camera wherein an infrared light active method is employed as an AF method because the radiation timing of infrared light for distance measurement and that of infrared light for remote-control operation are set so that they do not coincide.

Because of the arrangement that the state of AF-locking can be kept as long as a camera is in a remote-control mode, the invention further makes it possible to photograph easily any number of times, on a remote control basis, the same subject staying at the same position.

What is claimed is:

1. A camera for taking a photograph, comprising;
    a distance measurement means for measuring a distance between said camera and an object to be taken said photograph,
    wherein said distance measurement means irradiate a first infrared light beam onto said object for obtaining said distance,
    a remote control means for controlling a photo-taking operation of said camera,
    wherein said remote control means transmits a plurality of second infrared light beams to said camera,
    wherein said first infrared light beam is irradiated inbetween said plurality of second infrared light beams transmitted to said camera.

2. The camera claimed in claim 1,
    wherein said camera has a remote control mode for controlling said photo-taking operation with said remote control means, further comprising,
    a focus means for focusing said camera at said distance measured by said distance measurement means, and
    a control means for maintaining said camera focused at said distance while said camera is set for said remote control mode.

* * * * *

UNITED STATES PATENT AND TRADEMARK OFFICE
CERTIFICATE OF CORRECTION

PATENT NO. : 4,998,125

DATED : March 05, 1991

INVENTOR(S) : KOJI WATANABE ET AL.

It is certified that error appears in the above-identified patent and that said Letters Patent is hereby corrected as shown below:

ON THE TITLE PAGE:  Item [75]

Inventors, Line 3, change "Koyoshige" to --Kiyoshige--.

Signed and Sealed this

Fifteenth Day of December, 1992

Attest:

DOUGLAS B. COMER

Attesting Officer    Acting Commissioner of Patents and Trademarks